Patented Oct. 17, 1950

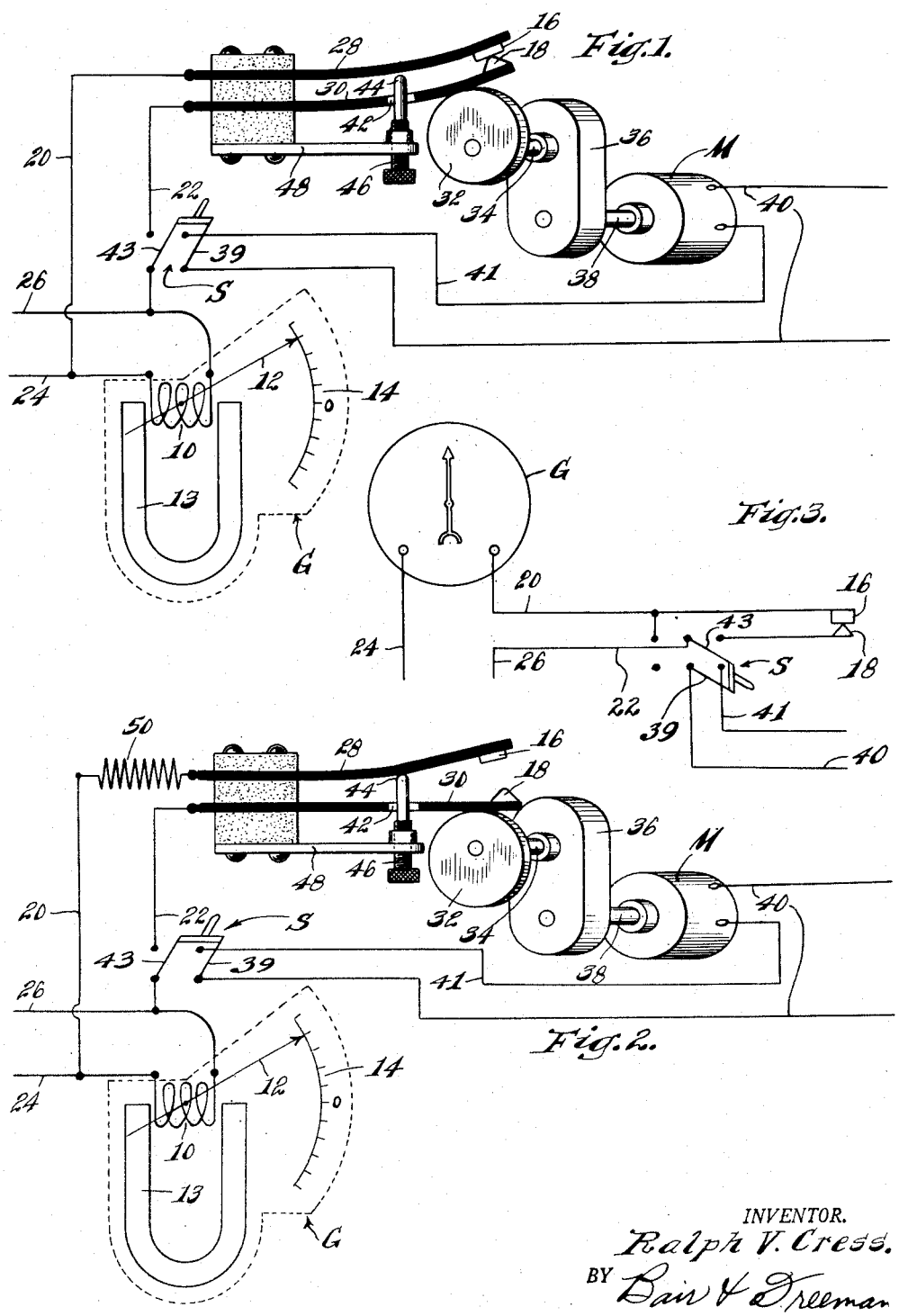

2,526,006

UNITED STATES PATENT OFFICE 2,526,006

DAMPING DEVICE FOR GALVANOMETERS AND THE LIKE

Ralph V. Cress, Syracuse, Ind., assignor to Penn Electric Switch Co., Goshen, Ind., a corporation of Iowa Application December 13, 1946, Serial No. 716,064

6 Claims. (Cl. 171—95)

This invention relates to a means for damping the indicating needle or mirror of a galvanometer or other electrical measuring and/or indicating instrument.

One object of the invention is to damp the movement of the indicating element (needle or mirror) in such manner that there is no loss of sensitivity, yet the element motion is effectively damped so as to reach its null position in a minimum of time.

Another object is to damp the indicating element of a galvanometer or the like by periodically, wholly or partially, short-circuiting or open-circuiting the current coil of the galvanometer as the indicating element swings toward its nil position.

Still another object is to provide damping means in the form of a timer device that periodically closes contacts, which contacts are shunted across or are in series with the current coil of an electrical measuring or indicating device either directly or with a resistor in series therewith.

A further object is to provide means for adjusting the open circuit periods of the timer device in relation to the closed circuit periods thereof to secure the most effective damping of the instrument needle.

Still a further object is to provide one embodiment of the invention comprising a short-circuiting arrangement for the coil of a galvanometer of the low period type to act as a brake on the motion of the indicating element with the action taking place periodically only so that between successive braking actions the full effect of the galvanometer coil is in operation to move the indicating element thereby resulting in a damping device that insures that the element will ultimately be stabilized at its true terminal position.

An additional object is to provide another embodiment of the invention in which is provided an open-circuiting arrangement for the coil of a galvanometer having a high period to act as a means to speed up the motion of the indicating element, again with the action taking place periodically only which results in periodic speeding up of the indicating element between successive making actions thereby causing the indicating element to reach the nil position in a minimum of time.

Another additional object is to provide a novel contact structure wherein the closed period time per cycle of operation may be adjusted in relation to the open contact period per cycle of operation, the adjustment being possible throughout the range from one hundred percent open circuit to one hundred percent closed circuit.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is an electro-diagrammatic view of a galvanometer and a damping device showing one embodiment of my invention connected therewith and shown in the closed circuit position.

Figure 2 is a similar view showing the damping device in the open circuit position and illustrating a resistor in circuit therewith, and Figure 3 is a diagrammatic view of a galvanometer and another embodiment of my damping device, with the damping contacts in series with the galvanometer instead of in parallel therewith.

On the accompanying drawings I have used the reference character G to indicate in general a galvanometer. The current coil thereof is indicated at 10 and the indicating needle at 12 cooperating with a scale 14.

The galvanometer of course may be of the type in which a mirror swings for swinging a reflected beam of light, image, or scale, and throughout the specification I will use the generic term "indicating element" to refer to either a needle, a beam of light or any type of indicator.

While I have specifically referred to a galvanometer, my damping device may be applied to other electrical instruments as well, either of the indicating type or the controlling type, and will serve its purpose in connection with any of them.

My damping device consists of a pair of contacts 16 and 18 connected as by wires 20 and 22 across the current supply wires 24 and 26 to the galvanometer coil 10. The contacts 16 and 18 are carried by leaf springs 28 and 30, respectively, and may be engaged and separated periodically as by a cam 32.

The cam 32 is mounted on the shaft 34 of a speed reducer 36 which in turn is driven through a motor shaft 38 from a motor M. The motor M is continuously energized during the taking of readings on the galvanometer and the current supply wires therefor are indicated at 40.

For controlling the current from the wires 40 to the motor M, I provide a switch blade 39 and an intermediate wire 41. The switch blade is part of a double pole single throw switch S, the other blade of which indicated at 43 is connected in series with the contacts 16 and 18 so that when the motor M is off there will be no current flow through the contacts 16 and 18 if the motor happens to stop in the position that leaves these contacts closed.

The leaf spring 30 has an opening 42 through which the stem 44 of an adjusting screw 46 extends. The screw 46 is threaded in a stationary bracket 48. The stem 44 may be adjusted as shown for instance in Figure 2 to hold the contact 16 stationary while the contact 18 is lowered by the cam 32.

The cam in its opposite position as shown in Figure 1 raises the contact 18 to a position of engagement with the contact 16. The position of the stem 44 determines the open contact time in relation to the closed contact time per cycle of rotation of the cam 32. This cam may rotate at some suitable speed such as once per second.

In the taking of readings on electrical instruments, especially nil readings of a galvanometer when used in connection with a Wheatstone bridge, an undamped instrument has a needle that swings slowly back and forth with the amplitude of swing decreasing until the needle finally comes to rest at its terminal position. This may take several seconds and in a laboratory where many readings are to be taken there is a considerable waste of time in waiting for the needle to become stabilized. A damping arrangement is therefore desirable.

Heretofore galvanometers have been damped by shunting a resistance of a pre-determined value across their current coils. While this effects some damping it also reduces the sensitivity of the instrument as the full effect of the current being measured is reduced by the resistor.

With my arrangement as shown in Figure 1 there is a direct short circuit of the galvanometer coil 10 which has the effect of a brake on the swinging needle, but the braking effect is periodically removed by the cam 32 rotating so that the contact 18 is separated from the contact 16. During the period of contact separation the full effect of the current being measured in the wires 24 and 26 is imposed in the coil 10 so that the result is swing of the needle 12 toward the terminal position but a periodic partial stopping of the needle during the total. There of course will be some momentum which prevents full stopping but even so in actual practice I have found that the needle seldom swings past the terminal position when damped in accordance with my invention and will accurately assume its terminal position in response to current flow in the wires 24 and 26 in a minimum of time.

For any particular galvanometer or instrument the timing can be adjusted by rotating the screw 46 so that the percentage of contact-closed to contact-open time is a compromise between the quickest return to terminal position and the greatest open-contact time. It is in this range that the greatest accuracy of reading is had. The damping device is particularly adapted for galvanometers and the like wherein readings on nil are to be made.

In the event that the damping action is too pronounced a resistor 50 may be included in the circuit of the contacts 16 and 18 and the galvanometer coil 10 as shown in Figure 2. The value of the resistor of course can be so related as to secure the desired damping effect.

The shunt circuits shown in Figures 1 and 2 are suitable for a galvanometer that has a low period and therefore a fast swing. When the contacts 16 and 18 are closed they slow the swing and the slow-down operation is reduced if necessary by use of the resistor 50. In a galvanometer that has a high period and therefore a slow swing it is desirable to speed up the swing to reduce reading time and this may be accomplished by connecting the contacts 16 and 18 in series with the coil of the galvanometer as in Figure 3 instead of shunt connecting them with the galvanometer as in Figure 1. Figure 3 shows the contacts cut directly into the wire 26 instead of connected across the wires 24 and 26.

With a series circuit as illustrated in Figure 3 the contacts 16 and 18 when opened speed up the swing of the indicating element rather than slowing it down as the current is off the galvanometer at the time these contacts open and it therefore tends to swing more quickly toward nil position. The contacts 16 and 18 being operated periodically cause periodic speed-up actions between periodic slow swing actions resulting from the loss of supply of the current to the galvanometer at the time the contacts are open.

For controlling the current in the motor energizing wires 40 and 41 the switch S in this case is a double pole double throw switch. The blade 39 as in Figure 1 controls the motor and the blade 43 is connected so that when the motor is energized the contacts 16 and 18 are in the galvanometer circuit and when the motor is de-energized they are shunted out of the circuit so that current flows to the galvanometer even though the motor may stop with the contacts 16 and 18 open.

During the making of some tests it is desirable to eliminate all possibility of inaccuracy due to the slowing down or speeding up action of the damping circuits disclosed and this is accomplished by stopping the motor M and simultaneously opening the circuit through the contacts 16 and 18 by means of the switch blades 39 and 43, respectively, of the switch S with the circuit of Figure 1.

The same is true with the circuit of Figure 3 wherein the motor has not been shown but it is controlled by the switch S so that the contacts 16 and 18 are short-circuited when the motor is stopped.

From the foregoing description it will be obvious that I have provided a simple damping arrangement for a galvanometer or the like which damps the indicating element motion without reducing the sensitivity of the instrument. The damping action is quite positive and results, in most instances, in the needle swinging to its terminal position without overrun. The device is also adjustable to vary the damping action and secure maximum accuracy of operation.

Some changes may be made in the construction and arrangement of the parts of my device without departing from the real spirit and purpose of my invention, and it is my intention to cover by my disclosures any modified forms of structure or use of mechanical equivalents which may be reasonably included within their scope.

I claim as my invention:

1. In a damping device for galvanometers and the like, a pair of contacts connected in circuit with the coil of the galvanometer, means independent of the galvanometer needle for periodically separating and engaging said contacts a number of times during the time the indicating needle of the galvanometer swings from one valve to another, and means for adjusting the closed contact period of said pair of contacts in relation to the open contact period.

2. In a damping device for a galvanometer, a pair of contacts and a resistor connected across the coil of the galvanometer, means independent of the galvanometer needle for periodically separating and engaging said contacts a plurality of times while the galvanometer needle is in motion, and means for adjusting the closed contact period in relation to the open contact period per cycle of operation.

3. In a damping device for galvanometers and the like, a pair of contacts shunting the coil of the galvanometer, timer means for periodically and repetitiously separating and engaging said contacts during a taking of a reading on the galvanometer, and means for adjusting the closed contact period in relation to the open contact period.

4. In a damping device for galvanometers and the like, a pair of contacts connected in series with the coil of the galvanometer, means independent of the galvanometer needle for periodically and repeatedly separating and engaging said contacts during the taking of a reading of the galvanometer, and means for adjusting the closed contact period in relation to the open contact period.

5. Damping means for a galvanometer or the like comprising a pair of contacts, motor driven timer means for periodically separating and engaging said contacts a number of times during galvanometer needle swing from one value to another, said contacts being connected in series with the coil of the galvanometer or the like, and a switch for opening the circuit of said motor and shunting said contacts out of the circuit of the galvanometer coil.

6. Damping means for a galvanometer comprising a pair of contacts, said contacts being connected in circuit with the coil of the galvanometer, timer means comprising an eccentric periodically and repeatedly engaging one of said contacts for engaging it with the other one during swing of the galvanometer needle, and means for varying the closed contact time in relation to the open contact time of said timer means comprising an adjustable stop for said other contact.

RALPH V. CRESS.

REFERENCES CITED

The following references are of record in the file of this patent:

UNITED STATES PATENTS

| Number | Name | Date |
|---|---|---|
| 683,831 | Arcioni | Oct. 1, 1901 |
| 807,774 | Rosehorn | Dec. 19, 1905 |
| 1,576,222 | Robbins | Mar. 9, 1926 |